US008244599B2

(12) United States Patent
Sundaresan

(10) Patent No.: US 8,244,599 B2
(45) Date of Patent: Aug. 14, 2012

(54) METHODS AND SYSTEMS FOR SOCIAL SHOPPING ON A NETWORK-BASED MARKETPLACE

(75) Inventor: Neelakantan Sundaresan, Mountain View, CA (US)

(73) Assignee: eBay Inc., San Jose, CA (US)

(*) Notice: Subject to any disclaimer, the term of this patent is extended or adjusted under 35 U.S.C. 154(b) by 1300 days.

(21) Appl. No.: 11/860,791

(22) Filed: Sep. 25, 2007

(65) Prior Publication Data

US 2008/0208714 A1 Aug. 28, 2008

Related U.S. Application Data

(60) Provisional application No. 60/904,337, filed on Feb. 28, 2007, provisional application No. 60/952,831, filed on Jul. 30, 2007.

(51) Int. Cl.
*G06Q 30/00* (2006.01)
(52) U.S. Cl. ...................... 705/27.1; 705/26.1
(58) Field of Classification Search .............. 705/26, 705/27
See application file for complete search history.

(56) References Cited

U.S. PATENT DOCUMENTS

| 8,010,460 B2* | 8/2011 | Work et al. ............... 705/319 |
|---|---|---|
| 2003/0126245 A1 | 7/2003 | Feltin et al. |
| 2003/0144911 A1 | 7/2003 | Lin-Hendel |
| 2004/0162736 A1* | 8/2004 | Casile et al. ............... 705/1 |
| 2005/0154639 A1* | 7/2005 | Zetmeir ............... 705/14 |
| 2005/0159998 A1* | 7/2005 | Buyukkokten et al. ......... 705/11 |
| 2005/0246187 A1 | 11/2005 | Maltzman |
| 2005/0256866 A1* | 11/2005 | Lu et al. ............... 707/5 |
| 2006/0009994 A1* | 1/2006 | Hogg et al. ............... 705/1 |
| 2006/0253581 A1* | 11/2006 | Dixon et al. ............... 709/225 |
| 2007/0136178 A1* | 6/2007 | Wiseman et al. ............... 705/37 |
| 2008/0097835 A1* | 4/2008 | Weiser ............... 705/14 |
| 2008/0154739 A1* | 6/2008 | Kalaboukis ............... 705/26 |

FOREIGN PATENT DOCUMENTS

WO WO-2008106435 A2 9/2008

OTHER PUBLICATIONS

Business Wire: "Digital Standard and Cinemark USA Present Cinemark Wireless; First-of-Its-kind, Interactive Networking Service for Movie-Goers," Mar. 9, 2006; Dialog file 610 #0001443896, 3pgs.*
PR Newswire: "HRmarketer.com Launches Social Networking Site for Human Resource Suppliers," Feb. 6, 2007, Dialog file 621 #04916956, 2pgs.*
"International Application Serial No. PCT/US2008/054991, Written Opinion mailed Jul. 29, 2008", P237.
"International Application Serial No. PCT/US2008/054991, Search Report mailed Jul. 29, 2008", P220.

* cited by examiner

*Primary Examiner* — Robert M. Pond
(74) *Attorney, Agent, or Firm* — Schwegman, Lundberg & Woessner, P.A.

(57) ABSTRACT

Methods and systems are provided for social shopping on a network-based marketplace. Specifically, the method receives a request, over a network, from a user in a community of users. The request is for an activity associated with a listing for sale in a network-based marketplace. The network-based marketplace is used by the community of users to transact listings of a single domain that is of interest to the community of users. The method updates a listing reputation score for the listing based on a user reputation score for the user. Finally, the method updates the user reputation score based on the listing reputation score.

36 Claims, 9 Drawing Sheets

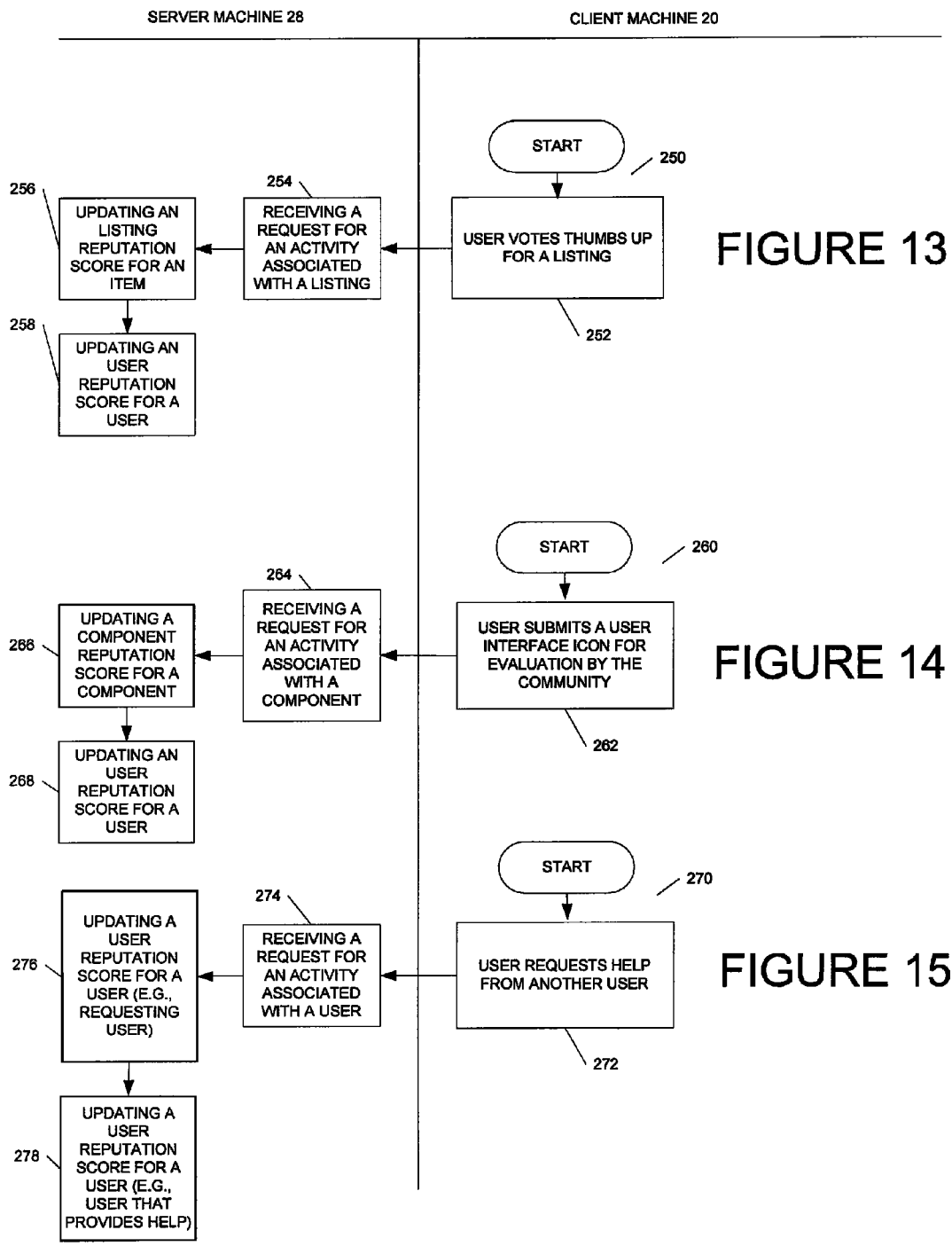

METHODS AND SYSTEMS FOR SOCIAL SHOPPING ON A NETWORK-BASED MARKETPLACE

RELATED APPLICATIONS

The present application claims the benefit of U.S. provisional application 60/904,337, filed Feb. 28, 2007 and U.S. provisional application 60/952,831. filed Jul. 30, 2007, both herein incorporated by reference.

FIELD

The present application relates generally to the technical field of data processing.

BACKGROUND

Applications available on the Internet have progressed from facilitating a medium of information delivery to a venue for sales and more recently to a platform for social networking. Online market places such as Amazon.com and eBay.com are examples of online sellers. Similarly, mySpace.com and Facebook.com are examples of social networking. Merging a venue for sales with a social network platform presents challenges.

BRIEF DESCRIPTION OF THE DRAWINGS

The present application is illustrated by way of example and not limitation in the figures of the accompanying drawings, in which like references indicate similar elements and in which:

FIG. 13 is a flow chart illustrating a method, according to an embodiment, to receive a request for an activity associated with a listing;

FIG. 14 is a flow chart illustrating a method, according to an embodiment, to receive a request for an activity associated with a component;

FIG. 15 is a flow chart illustrating a method, according to an embodiment, to receive a request for an activity associated with a user;

DETAILED DESCRIPTION

Methods and system for social shopping on a network-based marketplace are described. In the following description, for purposes of explanation, numerous specific details are set forth in order to provide a thorough understanding of the present application. It will be evident, however, to one skilled in the art that the present application may be practiced without these specific details.

Platform Architecture

Figure 1:
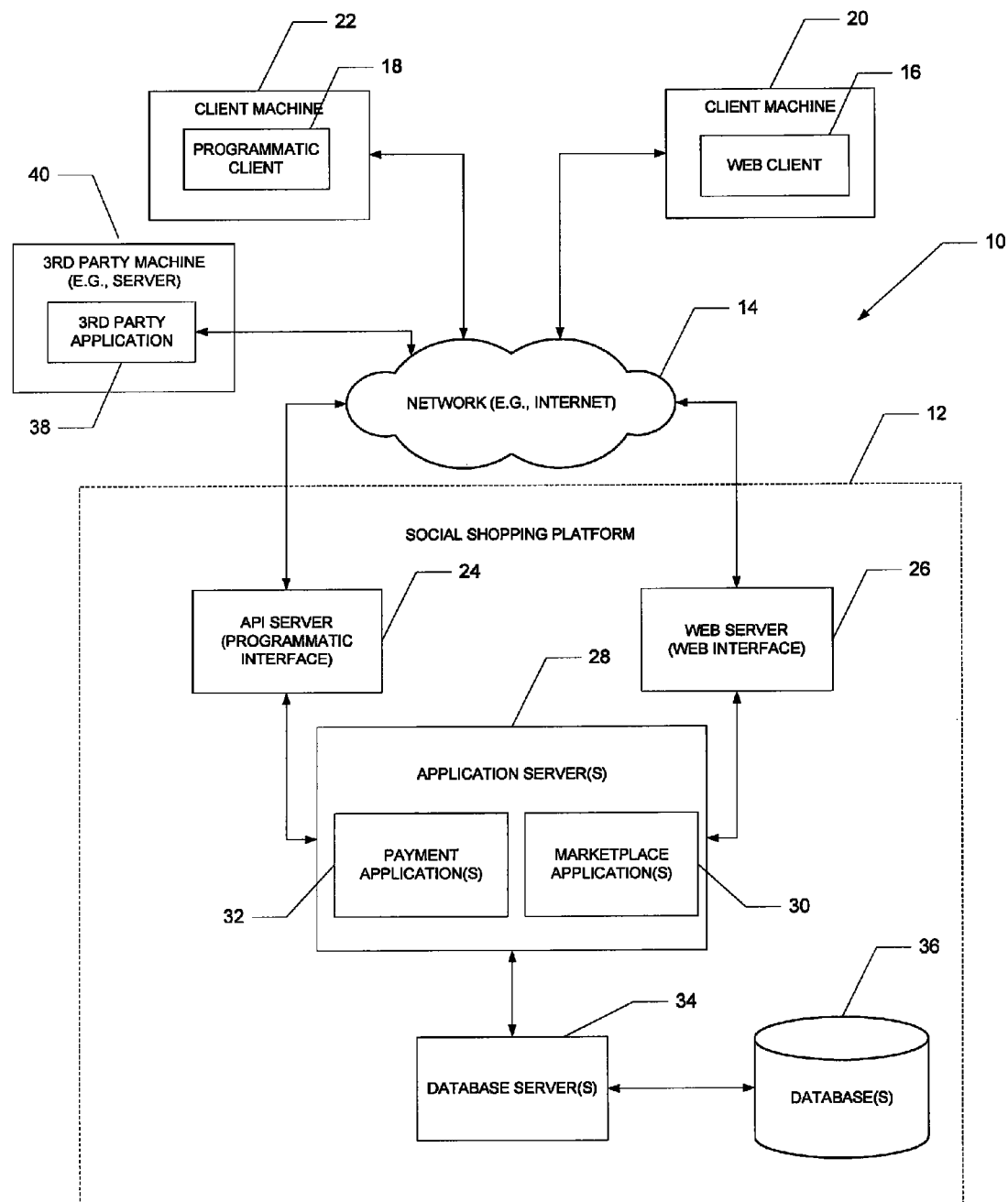
FIG. 1 is a network diagram depicting a system, according to one example embodiment, having a client-server architecture.

FIG. 1 is a network diagram depicting a system 10, according to one exemplary embodiment of the present application, having a client-server architecture. A commerce platform, in the exemplary form of a social shopping platform 12, provides server-side functionality, via a network 14 (e.g., the Internet) to one or more clients. FIG. 1 illustrates, for example, a web client 16 such as the INTERNET EXPLORER offered by MICROSOFT CORPORATION of Redmond, Wash., and a programmatic client 18 executing on respective client machines 20 and 22. The social shopping platform 12 hosts one or more network-based marketplaces that are respectively established, customized, and maintained by a community of users to achieve a social shopping experience. For example, a community of users may establish a network-based marketplace for social networking and online sales of Star Trek goods or services. The community of users may further customize the network-based marketplace for Star Trek listings of goods or services by selecting a custom graphical appearance (e.g., a skin) for the interfaces of the network-based marketplace, selecting a set of graphical rankings (e.g, Kirk, Spock, Bones, Scotty, Klingon, etc. that correspond to user reputation scores, selecting an icon that appears on the interfaces to graphically represent the community or some other customization. The community of users may further maintain the network-based marketplace by contributing components (e.g., a meetup application that enables users to arrange an off-line meeting time and place) to the network-based marketplace that may be accessed from the network-based marketplace, contributing listings to a community auction page on the network-based marketplace, voting up or down (e.g., components, listings, etc.), commenting (e.g., components, listings, etc.), referring community members, providing help to community members or other such maintenance. The above described network-based marketplace further includes a reputation system to encourage behaviors that are positive for the community and discourage negative behaviors. Such a reputation system may, in one embodiment, include providing reputation scores that are visible to the community on interfaces to provide incentives for the community. For example, providing reputation scores may include listing reputation scores for each of the listings, component reputation scores for each of the components contributed by a user, and user reputation scores for each of the users. Further, users may interact with listings, components and other users such that the reputation score of the user is based on the respective reputation scores of the listings, components and other users and vice versa.

Turning specifically to the social shopping platform 12, an application program interface (API) server 24 and a web server 26 are coupled to, and provide programmatic and web interfaces respectively to, one or more application servers 28.

The application servers 28 host one or more marketplace applications 30 and payment applications 32. The application servers 28 are, in turn, shown to be coupled to one or more database servers 34 that facilitate access to one or more databases 36.

The marketplace applications 30 provide a number of marketplace functions and services to users that access one or more of the network-based marketplaces. The payment applications 32 likewise provide a number of payment services and functions to users. The payment applications 32 may enable one user to pay another user. In addition, the payment applications 32 may allow users to qualify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. The payment applications 32 may, for example, be embodied as PAYPAL® sevices for processing electronic payment to and from others, an online service offered by EBAY of San Jose, Calif. While the marketplace and payment applications 30 and 32 are shown in FIG. 1 to both form part of the social shopping platform 12, it will be appreciated that, in alternative embodiments of the present application, the payment applications 32 may form part of a payment service that is separate and distinct from the social shopping platform 12.

Further, while the system 10 shown in FIG. 1 employs a client-server architecture, the present application is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TURBOLISTER™ application developed by EBAY, INC., of San Jose, Calif.) to enable sellers to author and manage listings on the social shopping platform 12 in an off-line manner, and to perform batch-mode communications between the programmatic client 18 and the social shopping platform 12.

FIG. 1 also illustrates a third party application 38, executing on a third party machine 40, as having programmatic access to the social shopping platform 12 via the programmatic interface provided by the API server 24. For example, a third party application 38 that is hosted on the third party machine 40 may provide listings in response to a request for listings (e.g., Star Trek listings) from the social shopping platform 12. The third party website may, for example, be embodied as the WORLDS ONLINE MARKETPLACES service hosted by EBAY, INC. of San Jose, Calif.

Marketplace Applications

Figure 2:
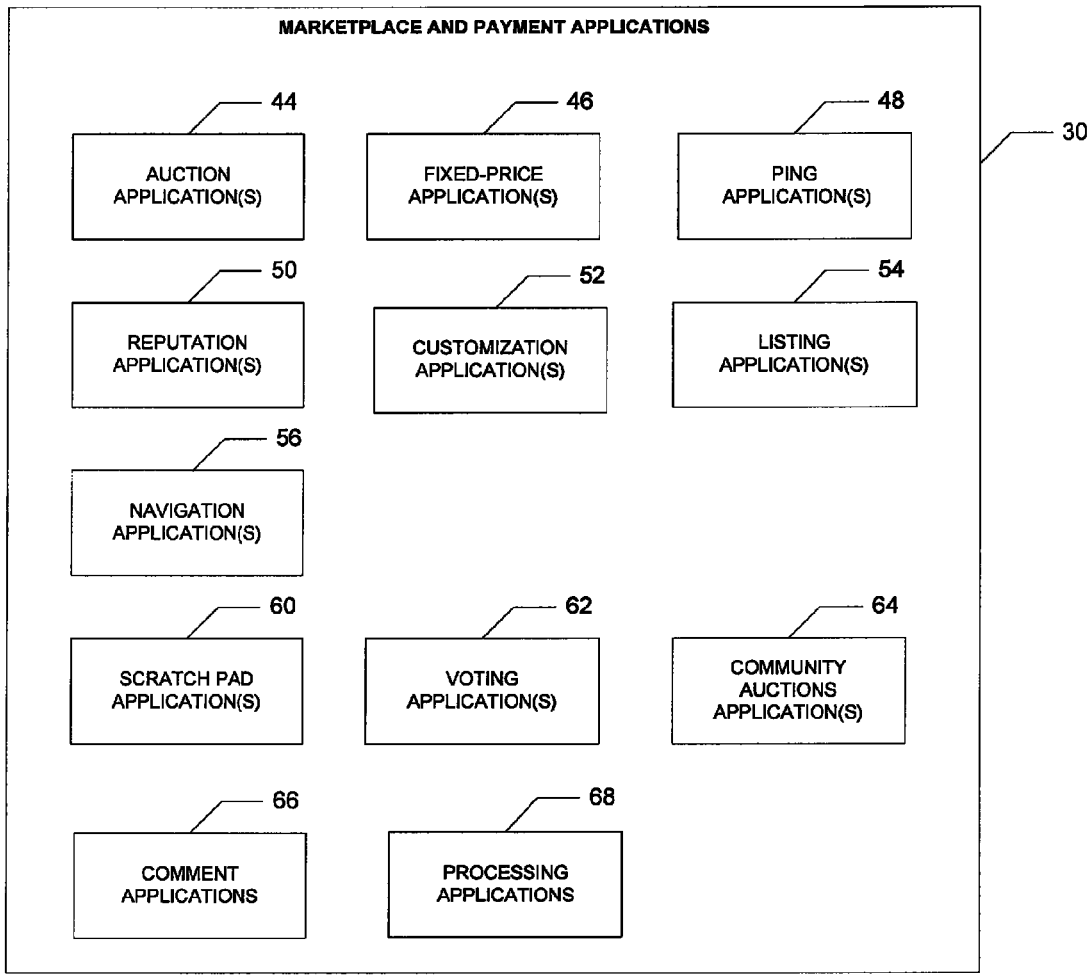
FIG. 2 is a block diagram illustrating marketplace and payment applications, according to an embodiment.

FIG. 2 is a block diagram illustrating multiple marketplace and payment applications 30, 32 that, in one exemplary embodiment of the present application, are provided as part of the social shopping platform 12. The social shopping platform 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the BUY IT NOW™ (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Ping applications 48, according to example embodiment, may be used to enable real time communication between users and between a user and the social shopping platform 12. A ping may be a text message to another user. The message may be a request to communicate off the ping system on another platform. The ping system may also be used by the social shopping platform 12 to send an alert to a user. In one embodiment, an alert may include a success message or a failure message responsive to an action by an user. In one embodiment an alert may be multicasted to users of a particular network-based marketplace (e.g., community) or broadcasted to all users on the social shopping platform 12. In one embodiment, the ping system may deliver a ping in a square container in the lower right corner of an interface that appears on a browser. In one embodiment, the ping system may use an alpha transparency fade effect as a ping transitions in and out of the container. In one embodiment, ping alerts may be stacked. For example, a ping that is received may be displayed on the bottom of a stack of previously displayed pings.

Reputation applications 50 maintain listing reputation scores, component reputation scores, and user reputation scores, as previously described. The reputation applications 50 may operate to process requests that are received from users and update reputation scores accordingly. For example, the reputation applications 50 may process a request from a user to perform an activity associated with a listing a component, or another user. The reputation applications 50 may update a database based on the requested activity and update the appropriate reputation scores. For example, a user may request that a thumbs up vote be cast for a listing. In response, the reputation applications 50 may store the vote in a database entry for the listing and in a database entry for the user. The thumbs up vote may contribute to improving the reputation score associated with the listing because a member of the community approved of the listing. Further, the thumbs up vote may contribute to improving the reputation score for the user because the user has helped to establish the value of the listing to the community. In addition, the reputation applications 50 may use the reputation score of the listing to update the reputation score of the user and the reputation score of the user to update the reputation score of the listing. Accordingly, a user with a relatively high reputation score may have a positive influence on a relatively low reputation score of a listing. Conversely, the relatively high reputation score of the user may be negatively influenced by the relatively low reputation score of the listing. Likewise, the reputation applications 50 perform similar processing for a request from a user for an activity associated with a component that is utilized on the network-based marketplace and for a request from a user for an activity with another user on the network-based marketplace. Accordingly, the reputation applications 50 allow users of the community to establish, build and maintain user reputation scores, which may be made available and published to other users of the community. Other users may then reference such a reputation for the purposes of assessing credibility, trustworthiness, and contributions that are consistent with the values of the community.

Customization applications 52 may allow users of the network-based marketplace to contribute user interface elements that are used to personalize the user interfaces of the network-based marketplace and to contribute applications that provide services for the users of the network-based marketplace. For example, the customization applications 52 may be utilized by the community of users to contribute user interface elements including a community icon user interface element, skin user interface elements, or ranking user interface elements. A community icon user interface element may consistently appear on user interfaces of the network-based marketplace.

Skin user interface elements may be applied to the user interfaces of the network-based marketplace to communicate a custom graphical appearance. Consistent application of the skin may result in a presentation of user interfaces with a look and feel that uniquely characterizes the community. In one embodiment, the skin user interface elements may include background images, background colors, header images, fonts, text size, text color, and more. In one embodiment, cascading style sheets (CSS), may be used to provide the described functionality in a Web based environment.

Ranking user interface elements may be a set of user interface elements with each element corresponding to a discrete rank or level (e.g., 1-10), as previously described. For example, a set of user interface elements may be downloaded by a user of the community from a remote site and the rank of each of the user interface elements (e.g., Kirk=top rank) may be determined according to vote by the community. Accordingly, a user interface element with a particular rank may be associated with user based the user reputation score of the user. For example, the reputation score of the user may be determined to fall within a range of user reputation scores associated with the rank. Different ranks may be associated with the same user in different network-based marketplaces (e.g., different communities). An user interface element corresponding to a rank and associated with a particular user in a community enables other users in the community to quickly identify the value of the user to the community.

The customization applications 52 further may allow users of the network-based marketplace to contribute applications that provides provide a service for the users of the network-based marketplace. For example, a user may select a service that enables users of the community to schedule off-line meetings. In one embodiment, a user may select the application MEETUP, an online service that brings groups together offline offered by MEETUP.COM of New York, N.Y.

Listing applications 54 may be used by the network-based marketplace to determine whether to a acquire a particular listing from a third party machine 40 (e.g, eBay), sort the order of appearance of the listings on a main auction interface on the network-based marketplace, and purge listings from the main auction interface on the network-based marketplace. The listing applications 54 may acquire, sort, and purge listings according to relevance information, reputation information, and a recency information. The relevance information may be provided by users of the network-based marketplace and may include keywords (e.g, "Star", "Trek", and "Memorabilia") that are selected according to the votes of the users of the community. The listing reputation information may include a listing reputation score as described later. The recency information includes the time remaining in an auction of the listing on the third party machine 40. The relevance information, listing reputation information and recency information may be respectively weighted to influence a determination of whether to acquire a particular listing from the third party machine 40.

Navigation of the social shopping platform may be facilitated by one or more navigation applications 56. For example, a search application enables key word searches of listings published via the network-based marketplace. In addition, the navigation applications 56 enable users to access various services offered by the network-based marketplace. For example, the navigation applications 56 applications enable users to access a wish list, news, reviews, guides, blogs, videos, a community auction interface, a main auction interface, a user profile interface, the ping system, community auctions, a community icon feature, a community skin feature, a ranking system, and a reputation calculator. Various other navigation applications 52 may be provided to supplement the search and browsing applications.

The scratch pad applications 60 enable dragging and dropping of objects to and from a scratch pad that appears on a user interface. The scratch pad may be a halfway point for transporting an object (e.g., listing, component, etc.). In one embodiment, the scratch pad may operate as a container for multiple objects. Further, the scratch pad applications 60 may transform an image of an object into a space efficient representation.

The voting applications 62 enable the users of the community to cast votes and determine an outcome of a community vote. For example, the voting applications 62 may process votes in favor of or opposed to a listing or a component (e.g., a feature, skin, ranking, a community icon, an application that provides a service to the community, etc.). Further, the voting applications 62 may determine the outcome of a vote. For example, the voting applications may determine the outcome of a thumbs up or thumbs down vote for a component such as a community icon.

The community auctions applications 64 may be used by users of the community to acquire particular listings from the third party machine 40 for auction on a community auction interface on the network-based marketplace.

The comment applications 66 may be used by users of the community to enter comments for listings. The comment applications 66 may include the comments on interfaces that are used to view the listings.

The processing applications 68 may receive information from the web interface or the programmatic interface and invoke the appropriate applications, as described above. For example, the processing applications 68 may receive a request from a user to vote in favor of a listing. In response to receiving the request, the processing application may invoke the voting applications 62 to record the vote for the listing and the reputation applications 50 to update the appropriate user reputation score and listing reputation score.

Figure 3:
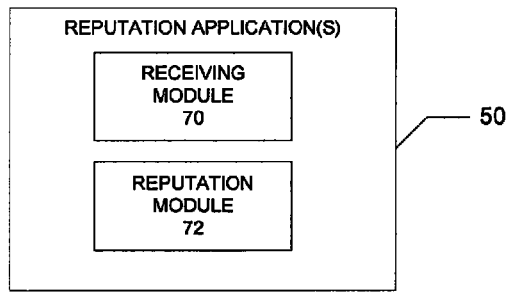
FIG. 3 is a block diagram illustrating reputation applications, according to an embodiment.

FIG. 3 is a block diagram illustrating reputation applications 50, according to an embodiment. The reputation applications include a receiving module 70 and a reputation module 72. The receiving module 70 may receive a request to perform an activity from a client machine 20, 22. The receiving module 70 uses the request to determine the type of activity and an activity constant associated with the activity. For example, the activity may be received from a user and associated with a listing, a component, or another user. The activity constant may be used to weight or scale the effect of the activity on an update of a reputation score. The reputation module 72 updates reputation scores. For example, the reputation module 72 may update a listing reputation score, a component reputation score or a user reputation score.

Figure 4:
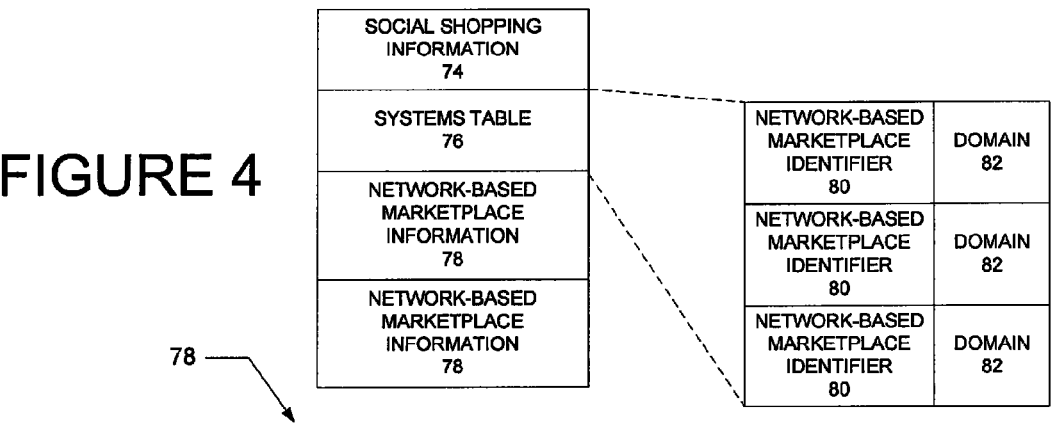
FIG. 4 is a block diagram illustrating social shopping information, according to an embodiment, stored on a database.

FIG. 4 is a block diagram illustrating a social shopping information 74, according to an embodiment, stored on database(s) 36. The social shopping information 74 includes a systems table 76 and one or more network-based marketplace information 78 entries. The systems table 76 includes information for the social shopping platform 12. Each network-based marketplace information 78 entry may include information for a specific network-based marketplace. Specifically, each network network-based marketplace information 78 may include a network-based marketplace identifier 80 and a domain 82. The network-based marketplace identifier 80 uniquely identifies a particular network-based marketplace. The domain 82 (e.g., Star Trek, Star Wars, etc.) may provide a user recognizable identity for the network-based marketplace. In one embodiment, the domain 82 may correspond to one or more categories on third party machine 40 (e.g., eBay).

Data Structures

Figure 5:
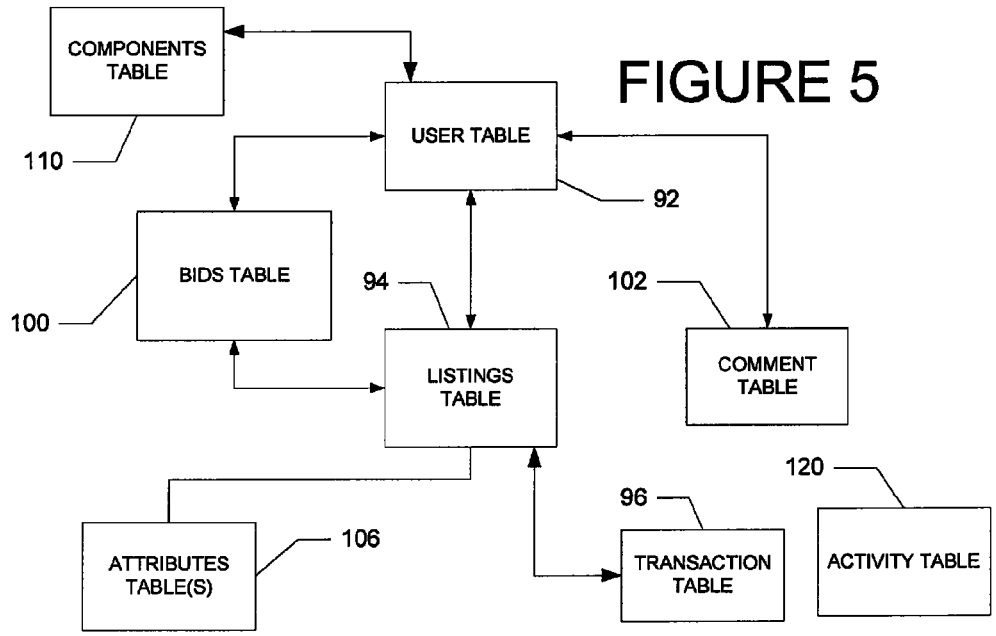
FIG. 5 is a block diagram illustrating network-based marketplace information, according to an embodiment.

FIG. 5 is a high-level entity-relationship diagram, illustrating various tables included in a network-based marketplace information 78 entry. The network-based marketplace information 78 may be maintained within the databases 36, and are utilized by and support a specific network-based marketplace (e.g., Star Trek). A user table 92 contains a record for each registered user of the network-based marketplace, and may include identifier, address and financial instrument information pertaining to each such registered user. A user may, it will be appreciated, operate as a seller, a buyer, or both, within the network-based marketplace. In one exemplary embodiment of the present application, a buyer may be a user that is able to buy or bid on listings that are offered for sale by the network-based marketplace.

The network-based marketplace information 78 also includes a listings table 94 in which are maintained listing records for goods and services that are available to be, or have been, transacted via the network-based marketplace. Each listing record within the listings table 94 may furthermore be linked to one or more user records within the user table 92, so as to associate a seller and one or more actual or potential buyers with each listings record. The listings table 94 may further store information for a listing reputation score for each of the respective listings.

A transaction table 96 contains a record for each transaction (e.g., a purchase transaction) pertaining to listings for which records exist within the listings table 94.

Bid records within a bids table 100 each relate to a bid received at the social shopping platform 12 in connection with an auction-format listing supported by an auction application 44. One or more attributes tables 106 record attribute information pertaining to listings for which records exist within the listings table 94. Considering only a single example of such an attribute, the attributes tables 106 may indicate a currency attribute associated with a particular listing, the currency attribute identifying the currency of a price for the relevant listing as specified by a seller. A components table 110 may store user interface elements that may be used to generate interfaces for the network-based marketplace and store linkage information to applications that provide services for users of the community. In addition, the components table 110 may further store information for a component reputation score for each of the respective components. The comment table 102 may store comments that have been entered by users of the community for listings and components. The activity table 120 may store activity constants that may be associated with activities that may be request by a user. For example, a user may request an activity associated with a listing, a component, or another user.

Figure 6:
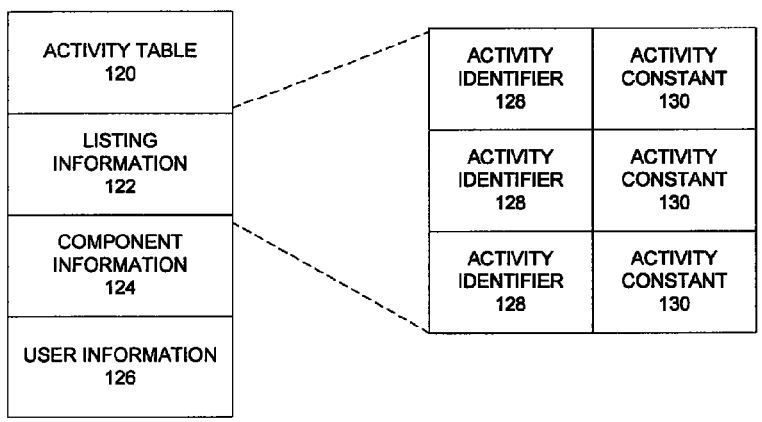
FIG. 6 is a block diagram illustrating an activity table, according to an embodiment.

FIG. 6 is a block diagram illustrating an activity table 120, according to an embodiment. The activity table 120 is used by the receiving module 70 to associate activity constants 130 to requests for activities. The activity constant 130 is used by the reputation module 72 to provide a weight to an activity in updating a reputation score. For example, activities for a listing may include commenting on the listing, bidding on the listing, and submitting a winning bid for the listing with respective activity constants being 1, 2, and 3. Accordingly, in one embodiment, the activity of submitting a winning bid may contribute greater weight to the listing reputation score than the other mentioned activities. The activity table 120 includes listing information 106, component information 108, and user information 126. The listing information 122 includes an activity identifier 128 that is used to associate an activity constant 130 to an activity for a listing. The component information 122 and the user information 124 likewise include activity identifiers 128 and activity constants 130 that correspond to component and user activities.

Figure 7:
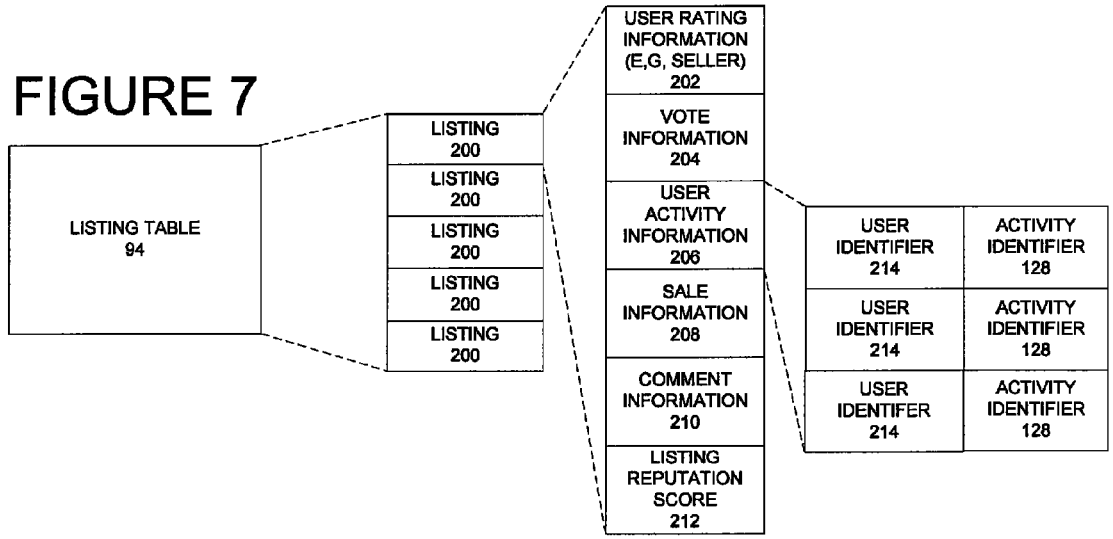
FIG. 7 is a block diagram illustrating a listings table, according to an embodiment.

FIG. 7 is a block diagram illustrating a listings table 94, according to an embodiment. The listing table 94 includes a listing 200 entry for each listing on the network-based marketplace. Each listing 200, in addition to other information not illustrated, is shown to include user rating information 202, vote information 204, user activity information 206, sale information 208, comment information 201 that are utilized by the reputation module 72 to update a listing reputation score 212 for the listing 200. The user rating information 202 may include a rating of the seller of the listing 200. For example, the listing 200 may have been retrieved from a third party machine 40 (e.g., eBay) that maintains a user rating for each of the users. In one embodiment, the seller rating may be an value that may range from zero to ten that is used to communicate a reputation of the user. The vote information 204 may record thumbs-up votes and thumbs-down votes from the users of the community expressing their approval or disapproval of the listing 200. The user activity information 206 may be used to update the listing reputation score 212 based on user reputation scores. The user activity information 206 may include activities that are associated with the listing and requested by a user. For example, an activity of a user requesting a thumbs-up vote for the listing may be recorded as user activity information 206. Accordingly, the user reputation score of the user may be used to update the listing reputation score. Associated with each activity may be a user identifier 214 and an activity identifier 128. The user identifier 214 may be used to identify the user and the activity identifier 128 may be used to identify the activity and to associate an activity constant 101 with the activity. The sale information 208 may include the number of bids received for the listing. The comment information 210 may record comments from the users of the community for the listing 200.

Figure 8:
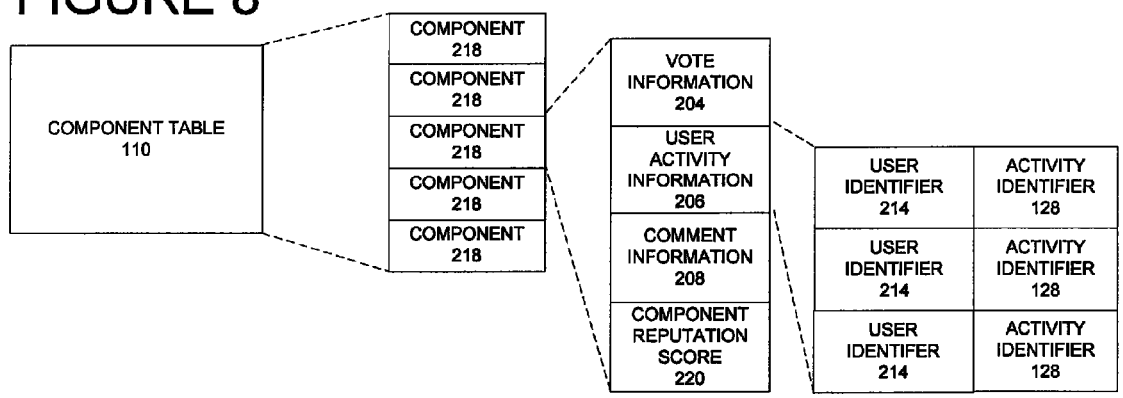
FIG. 8 is a block diagram illustrating a component table, according to an embodiment.

FIG. 8 is a block diagram illustrating an component table 110, according to an embodiment. The component table 110 includes a component 218 entry for each component on the network-based marketplace. For example, a component 218 entry may correspond to a community icon user interface element, a set of skin user interface elements, a ranking user interface elements, or an application that provides a service. Each component 218, in addition to other information not illustrated, is shown to include vote information 204, user activity information 206, comment information 201 that are utilized by the reputation module 72 to update a component reputation score 220 for the component 218. The user activity information 206 may be used to update the component reputation score 220 based on user reputation scores. The user activity information 206 may include activities that are associated with the component and requested by a user. For example, an activity of a user requesting submission of user interface icon for a vote by the community may be recorded as user activity information 206. Accordingly, the user reputation score of the user may be used to update the component reputation score 220. The user activity information 206 for the component 218 likewise includes a user identifier 214 and an activity identifier 128 for each activity.

Figure 9:
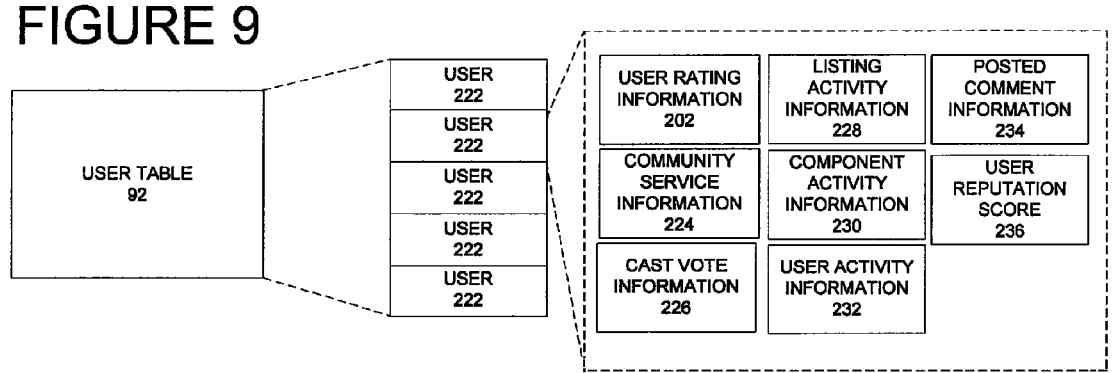
FIG. 9 is a block diagram illustrating an user table, according to an embodiment.

FIG. 9 is a block diagram illustrating an user table 92, according to an embodiment. The user table 92 includes a user entry 222 for each user on the network-based marketplace. Each user entry 222, in addition to other information not illustrated, is shown to include user rating information 202, community service information 224, cast vote information 226, listing activity information 228, component activity information 230, user activity information 232, posted comment information 234 that are utilized by the reputation module 72 to update a user reputation score 220 for the user entry 222. The community service information records contributions made by the user to the community. For example, the user may post a listing for auction, contribute a component (e.g., an icon user interface element, contribute a rank user interface element, contribute an application that provides a service to the community, etc.), refer new user to the community, provide help to a user in the community or any other quantifiable contribution to the community. In one embodiment, each of the previously described services for the community may be recorded by incrementing a counter by one. Other embodiments may use different values. The cast vote information 226 may be used to record votes cast by the user. For example, the user may cast votes for a listing or a component. The listing activity information 228 may be used to update the user reputation score 236 based on listing reputation scores 212. The listing activity information 228 may include activities that are requested by the user and associated with a listing 200. The component activity information 230 may be used to update the user reputation score 236 based on component reputation scores 220. The component activity information 230 may include activities that are request by the user and associated with a component 218. The user activity information 232 may be used to update the user reputation score 236 based other user reputation scores 236. The user activity information 232 may include activities that are requested by the user and associated with another user.

Figure 10:
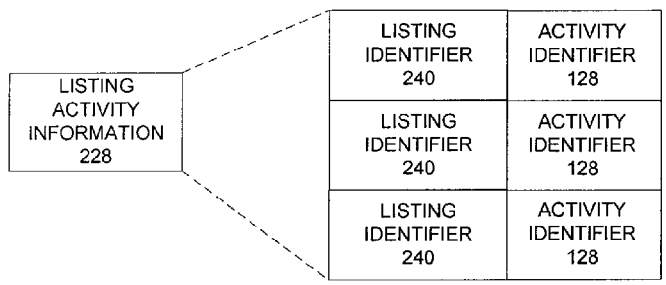
FIG. 10 is a block diagram illustrating listing activity information, according to an embodiment.

FIG. 10 is a block diagram illustrating listing activity information 228, according to an embodiment. The listing activity information 228 may be accessed via a user entry 222 in the user table 92 and is used by the reputation module 72 to update the corresponding user reputation score 236 based on listing reputation scores 212. The listing activity information 228 includes an entry for each activity requested by the user for a listing 200. The listing 200 and the corresponding listing reputation score 212 may be identified by the listing identifier 240 and the activity and a corresponding activity constant 130 may be identified by an activity identifier 128.

Figure 11:
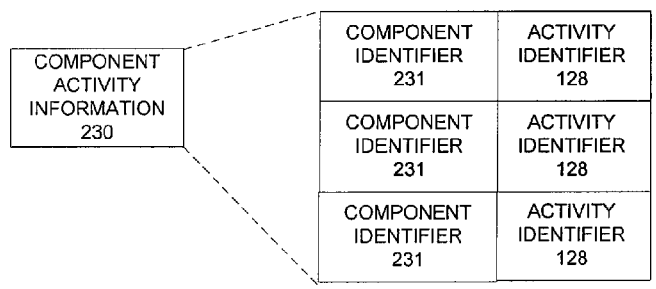
FIG. 11 is a block diagram illustrating component activity information, according to an embodiment.

FIG. 11 is a block diagram illustrating component activity information 230, according to an embodiment. The component activity information 230 may be accessed via a user entry 222 in the user table 92 and is used by the reputation module 72 to update the corresponding user reputation score 236 based on component reputation scores 220. The component activity information 230 includes an entry for each activity requested by a user for a component 218. The component 218 and the associated component reputation score 220 may be identified by a component identifier 231 and the activity may be identified by an activity identifier 128.

Figure 12:
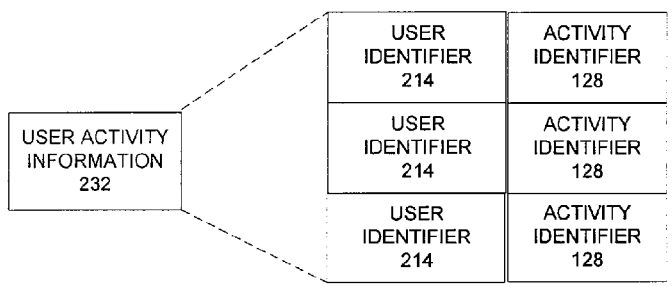
FIG. 12 is a block diagram illustrating user activity information, according to an embodiment.

FIG. 12 is a block diagram illustrating user activity information 232, according to an embodiment. The user activity information 232 may be accessed via a user entry 222 in the user table 92 and is used by the reputation module 72 to update the corresponding user reputation score 236 based on other user reputation scores 236. The user activity information 232 includes an entry for each activity requested by a user that is related to a second user. The user reputation score 236 of the second user may be identified by a user identifier 214 and the activity may be identified by an activity identifier 128.

FIG. 13 is a flow chart illustrating a method 250, according to an embodiment, to receive a request for an activity associated with a listing and update reputation scores. Illustrated on the right is an operation performed by a client machine 20 and illustrated on the left are operations performed by the application server machine 28. The method 250 commences at operation 252 with a user at the client machine 20 requesting a thumbs up vote be cast for a listing. For example, the user may be voting in favor of a listing for a DVD of the Star Trek Movie: The Next Generation. The user may be voting favorably for the listing because he believes the DVD is appropriate for the site and would like to see additional listings like the one viewed. In one embodiment, the request may include an activity identifier 128, a listing identifier 240, a user identifier 214, and a favorable vote.

At operation 254, at the application server machine 28, the processing applications 68 identify the appropriate network-based marketplace (e.g., Star Trek), invoke voting applications 62 to register the vote, and invokes the receiving module 70 to update the listing 200 and the user entry 222. The receiving module 79 updates the listing 200 in the listing table 94 and the user entry 222 in the user table 92. The receiving module 79 updates the listing 200 in the listing table 94 based on the listing identifier 240 in the request. The receiving module 79 updates the user entry 222 in the user table 92 based on the user identifier in the request.

The receiving module 70 updates the listing 200 by updating the vote information 204 (e.g., +1) and adding an entry to the user activity information 206. The receiving module 70 adds an entry that includes the appropriate activity constant 130 and the activity identifier 128 from the request.

The receiving module 70 updates the user entry 222 by updating the cast vote information 226 (e.g., +1) and adding an entry to the listing activity information 228. The receiving module 70 adds an entry that includes the appropriate activity constant 130 the activity identifier 128 from the request.

Updating the Listing Reputation Score

At operation 256, the reputation module 72 updates the listing reputation score 212 for the listing 200 that received the vote. In one embodiment the reputation module 72 may update the listing reputation score 212 as follows:

$$LRS = \text{user rating} + \text{votes} + \text{bids} + \text{comments} + (\text{SUM}_{i \cdot j} [URS_i * K_i])/N$$

Where:

LRS=listing reputation score 212
user rating=user rating information 202
votes=vote information 204
bids=sale information 208
comments=comment information 210
URS=user reputation score 236
K=activity constant 130
N=number of user reputation scores 236

Accordingly, the listing reputation score 212 may be based on the user rating information 202, the vote information 204, the sale information 208, the comment information 210 and the user reputation scores 236 that may be respectively scaled with an activity constant 130. The user rating information 202 may include a rating of the seller that posted the listing. The vote information 204 may include the net votes which may be an integer (e.g., positive or negative whole number). The sale information 208 may include the number of bids for the listing. The comment information 210 may include the number of comments for the listing.

The user reputation scores 236 may be retrieved from the user table 92 according to user identifiers 214 in the user activity information 206 in the listing table 94.

Other examples of requests for activities that may be received for the listing 200 may include contributing a listing for sale, posting a comment for a listing, bidding on a listing, submitting a winning bid for a listing, and buying a listing.

Updating the User Reputation Score

At operation 258, the reputation module 72 updates the user reputation score 236 for the user that cast the vote. In one embodiment the reputation module 72 may update the user reputation score 236 as follows:

$$URS=\text{user rating}+\text{community service}+\text{cast votes}+ (SUM_{i\text{-}j}[LRS_i*K_i])/N_l+(SUM_{i\text{-}j}[CRS_i*K_i])/N_c+ (SUM_{i\text{-}j}[URS_i*K_i])/N_u+\text{posted comments}$$

Where:
URS=user reputation score 236
user rating=user rating information 202
community service=community service information 224
cast votes=cast vote information 226
LRS=listing reputation score 212
CRS=component reputation score 220
URS=user reputation score 236
K=activity constant 130
$N_l$=number of listing reputation scores 212
$N_c$=number of component reputation scores 220
$N_u$=number of user reputation scores 236
posted comments=posted comment information 234

Accordingly, the user reputation score 236 may be based on the user rating information 202, the community service information 224, the cast vote information 226, the listing reputation scores 212 that may be respectively scaled with an activity constant 130, the component reputation scores 220 that may be respectively scaled with an activity constant 130, the user reputation scores 236 that may be respectively scaled with an activity constant 130, and the posted comment information 234.

The community service information 224 may include activities where the user takes some action that may be characterized as serving the community. For example, community service may include contribution of a user interface icon, contribution of a ranking interface element, contribution of an application (e.g., meetup), contribution of a listing to a community auction page or any other contribution that may be considered a benefit to the community. In one embodiment, each of the community services may have a value of one and be associated with a constant that may be used to scale the value.

The listing reputation scores 212, the component reputation scores 220 and the user reputation scores 236 may be retrieved respectively via the listing activity information 228, component activity information 230, and user activity information 232 for the user entry 222 that correspond to the user that requested the activity. The listing reputation scores 212 may be retrieved from the listing table 94 according to listing identifiers 240 in the listing activity information 228 in the user table 92 for the user that requested the activity. The component reputation scores 220 may be retrieved from the component table 110 according to component identifiers 231 in the component activity information 230 in the user table 92 for the user that requested the activity. The user reputation scores 236 may be retrieved from the user table 92 according to user identifiers 214 in the user activity information 232 in the user table 92 for the user that requested the activity. In another embodiment, the reputation score for the user entry 222 may be updated before the reputation score for the listing 200.

Another embodiment of the above method may not update the listing reputation score 212 and the user reputation score 236 in response to receiving a request for an activity associated with a listing. Rather, listing reputation scores 212 and user reputation scores 236 may be updated periodically and asynchronous to receipt of a request for an activity associated with a listing and update of the appropriate listing 200 and user entry 222.

FIG. 14 is a flow chart illustrating a method 260, according to an embodiment, to receive a request for an activity associated with a component 218 and update reputation scores. Illustrated on the right is an operation performed by a client machine 20 and illustrated on the left are operations performed by the application server machine 28. The method 260 commences at operation 260 with a user at the client machine 20 requesting submission of a user interface icon for evaluation by the community. For example, the user may be uploading a user interface icon of the Star Ship Enterprise. In one embodiment, the request may include an activity identifier 128, a user identifier 214, a component identifier 231, and a user interface icon.

At operation 264, at the application server machine 28, the processing applications 68 may identify the appropriate network-based marketplace (e.g., Star Trek), invoke customization applications 52 to register the user interface icon in the component table 110, and invoke the receiving module 79 to update the component 218 and the user entry 222.

The receiving module 79 receives the request and updates the component 218 in the component table 110 and the user entry 222 in the user table 92. The receiving module 79 updates the component 218 based on the component identifier 23 in the request. The receiving module 79 updates the user entry 222 based on the user identifier 214 in the request.

The receiving module 70 updates the component 218 by adding an entry to the user activity information 206. The receiving module 70 adds an entry that includes the appropriate activity constant 130 and the activity identifier 128 from the request.

The receiving module 70 updates the user entry 222 by updating the community service information 224 (e.g., +1) and by adding an entry to the component activity information 230. The receiving module 70 adds an entry that includes the appropriate activity constant 130 and the activity identifier 128 from the request.

Updating the Component Reputation Score

At operation 266, the reputation module 72 updates the component reputation score 220 for the component 218 that was contributed. In one embodiment the reputation module 72 may update the component reputation score 220 as follows:

$$CRS=\text{votes}+\text{comments}+(SUM_{i\text{-}j}[URS_i*K_i])/N$$

Where:
CRS=component reputation score 220
votes=vote information 204
comments=comment information 210
URS=user reputation score 236
K=activity constant 130
N=number of user reputation scores 236

Accordingly, the component reputation score 220 may be based on the vote information 204 and user reputation scores 236 that may be respectively scaled with an activity constant 130. The vote information 204 may include the net votes which may be a positive or negative integer. The user reputation scores 236 may be retrieved from the user table 92 according to user identifiers 214 in the user activity information 206 in the component table 110.

Other requests for activities that may be received for the component 218 may include voting for or against the component.

Updating the User Reputation Score

At operation 268, the reputation module 72 updates the user reputation score 236 for the user that requested submission of the user interface icon. In one embodiment the reputation module 72 may update the user reputation score 236 as previously described in operation 258. In another embodiment, the reputation score for the user entry 222 may be updated before the reputation score for the component 218.

Another embodiment of the above method may not update the component reputation score 220 and the user reputation score 236 in response to receiving a request for an activity associated with a component. Rather, component reputation scores 220 and user reputation scores 236 may be updated periodically and asynchronous to receipt of a request for an activity associated with a component and update of the component 218 and the user entry 222.

FIG. 15 is a flow chart illustrating a method, according to an embodiment, to receive a request for an activity associated with a user 22 and update reputation scores. Illustrated on the right is an operation performed by a client machine 20 and illustrated on the left are operations performed by the application server machine 28. The method 270 commences at operation 272 with a user at the client machine 20 requesting help from another user in the community. For example, the user may be requesting help from John Doe, with a number one ranking. In one embodiment, the request may include an activity identifier 128, a user identifier 214 for the requesting user, and a user identifier 214 for John Doe.

At operation 274, at the application server machine 28, the processing applications 68 may identify the appropriate network-based marketplace (e.g., Star Trek), invoke ping applications 48 to facilitate communications between the requesting user and John Doe, and invoke the receiving module 79 update user entries 222.

The receiving module 79 receives the request and updates the user entry 222 in the user table 92 based the user identifier 214 for the requesting user. In addition the receiving module 79 updates the user entry 222 in the user table 92 based on the user identifier 214 for John Doe.

The receiving module 70 updates the user entry 222 for the requesting user by adding an entry to the user activity information 232. The receiving module 70 adds an entry that includes the appropriate activity constant 130 and the activity identifier 128 from the request.

The receiving module 70 updates the user entry 222 for John Doe by updating the community service information 224 (e.g., +1) and by adding an entry to the user activity information 232 The receiving module 70 adds an entry that includes the appropriate activity constant 130 and an activity identifier 128 that indicates John Doe provided help.

Updating the User Reputation Score for the User that Requested Help

At operation 276, the reputation module 72 updates the user reputation score 236 for the user that requested help. In one embodiment the reputation module 72 may update the user reputation score 236 as previously described in operation 258.

Updating the User Reputation Score for the User that Provided Help

At operation 278, the reputation module 72 updates the user reputation score 236 for the user that provided help. In one embodiment the reputation module 72 may update the user reputation score 236 as previously described in operation 258.

Other user activity may include a user referring another user to the community. In another embodiment, the reputation score for the user that provided help may be updated before the reputation score for the user that received help.

Another embodiment of the above method may not update the user reputation scores 236 in response to receiving a request for an activity associated with a user. Rather, user reputation scores 236 may be updated periodically and asynchronous to receipt of a request for an activity associated with a user and update of the user entries 222.

User Interfaces

Figure 16:
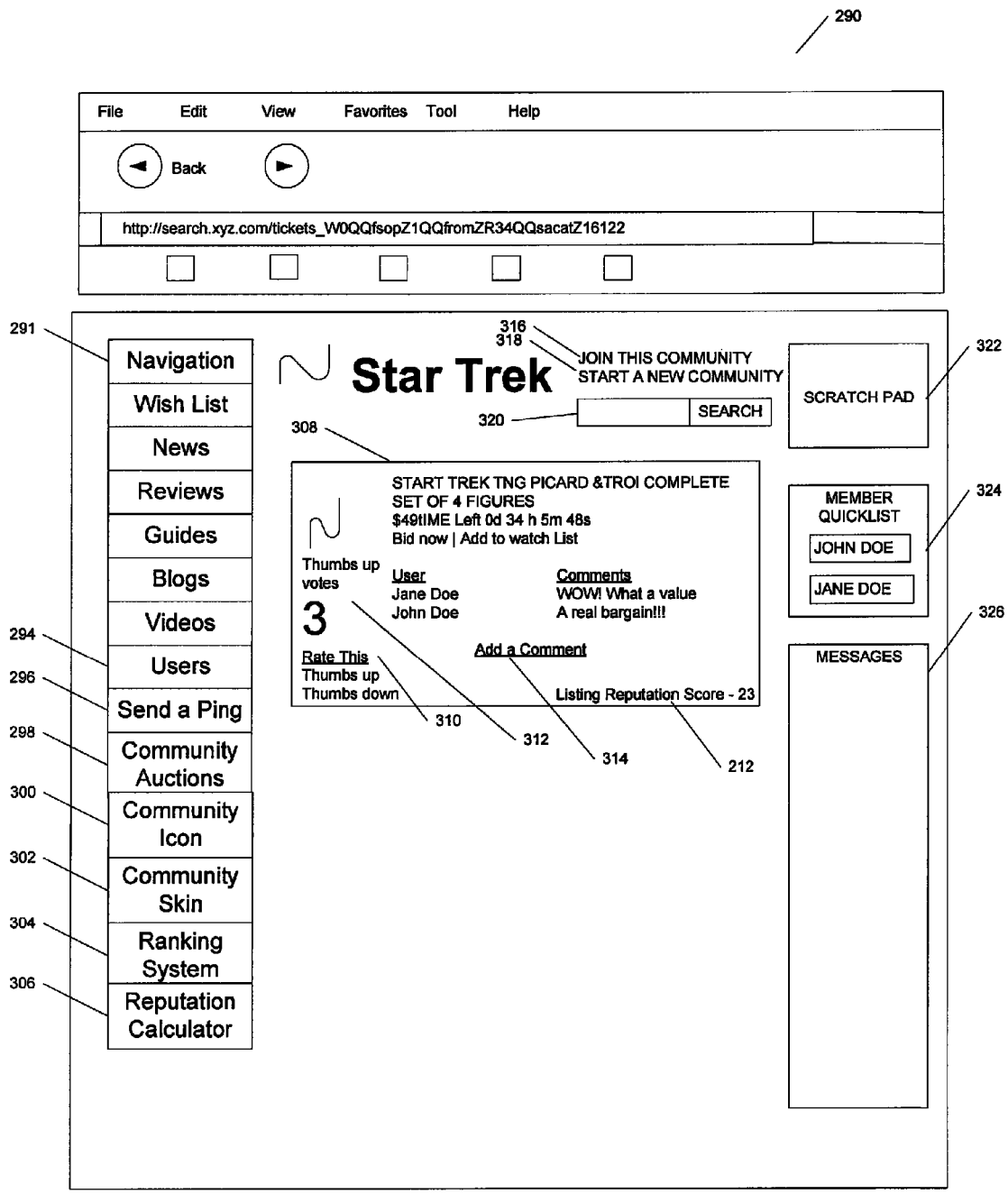
FIG. 16-17 are diagrams illustrating interfaces, according to an embodiment.

FIG. 16 is a diagram illustrating an interface 290, according to an embodiment, for a main auction. The interface 290 is shown to include a left panel, a center panel, and a right panel. The left panel includes user interface elements that may be selected to access various services. The left panel includes a navigation services user interface element 291, a user services user interface element 294, a ping services user interface element 296, a community auctions user interface element 298, a community icon user interface element 300, a community skin user interface element 302, a ranking user interface element 304, and a reputation calculator user interface element 306. The navigation services user interface element 291 may be selected to navigate through interfaces of the network-based marketplace. The user services user interface element 294 may be selected to view information about users in the community. The ping services user interface element 296 may be selected to communicate with another user in the community or to communicate with the network-based marketplace. The community auctions user interface element 298 may be selected to view a community auctions interface that includes listings 200 that have been selected by a member of a community from a third party machine 40 and to bid on the listings 200. The community icon user interface element 300 may be selected to contribute or vote on a community icon user interface element. The ranking user interface element 304 may be selected to contribute a ranking user interface element or to vote on a ranking of ranking user interface elements. The reputation calculator may be selected to calculate a listing reputation score 212, a component reputation score 220, or a user reputation score 236.

The middle panel of the user interface 290 may include listing user interface elements 308 for listings 200. The user interface 290 may present listings for auction and/or for purchase. The listing user interface element 308 is for auction and includes a vote count 312 that communicates the net number of votes for the listing 200, user interface elements 300 that may be used to cast a vote in favour of or against the listing, a user interface element 314 to add a comment, and a listing reputation score 212. The middle panel further includes a user interface element 316 to join the community, a user interface element 318 to start a new community, and a user interface element 320 to search for other network-based marketplaces on the social shopping platform 12.

The right panel of the user interface 290 may include a scratch pad 322, a member quicklist 324, and a message box 326. The scratch pad 322 may be used to annotate a listing 200, a component 218 or other objects on the network-based marketplace. The member quicklist 324 may be used to communicate with a community member and the message box 326 may be used to send and receive messages.

Figure 17:
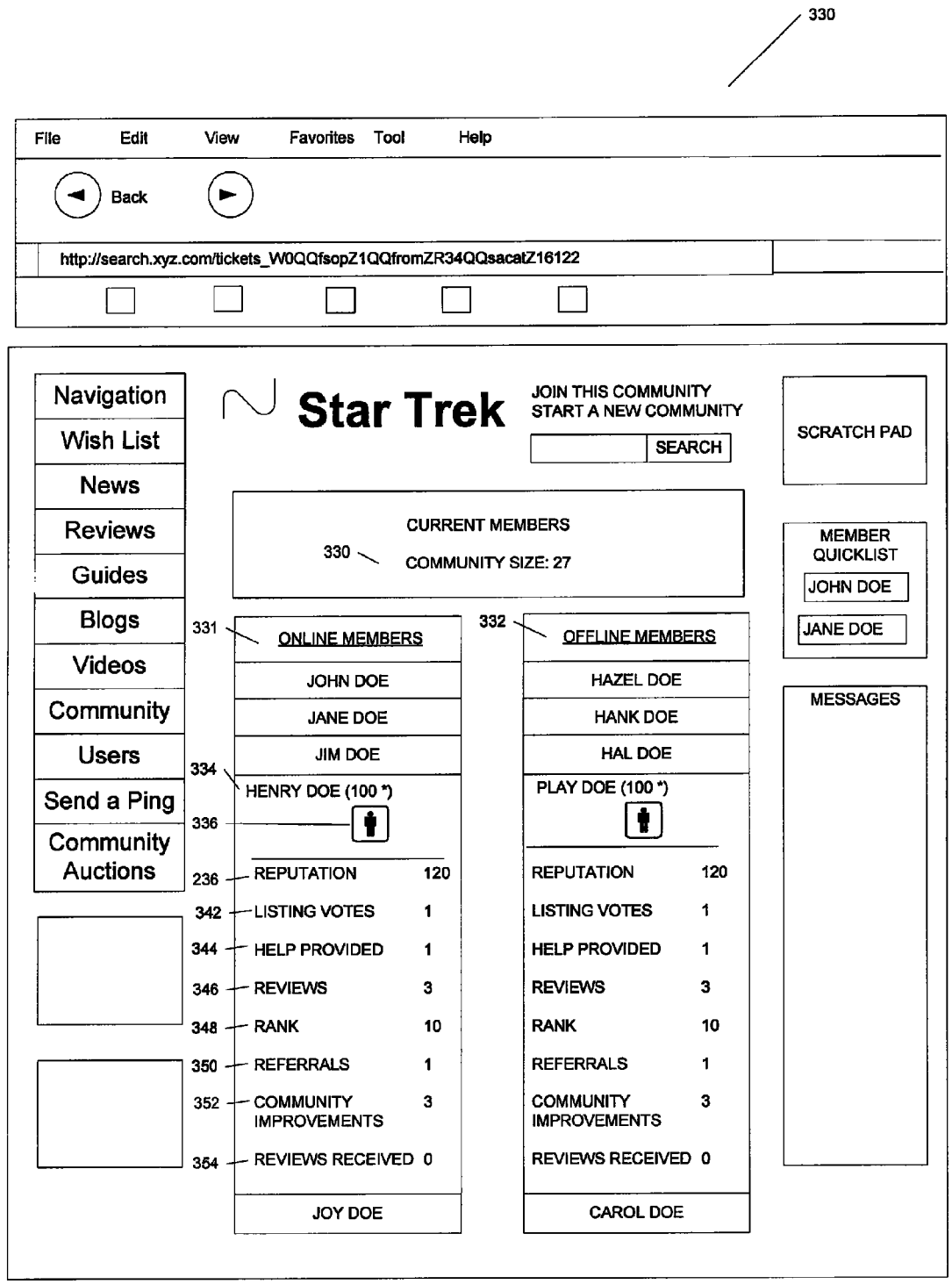

FIG. 17 is a diagram illustrating an interface 330, according to an embodiment, to display user information. The interface 330 includes a left middle panel 331 and a right middle panel 332. The left middle panel 331 presents user information of users that are online (e.g., signed on to the network-based marketplace) and the right middle panel 332 presents user information of users that are offline. The left middle panel 331 includes user names that may be selected. For example, the user "Henry Doe" may be selected and is shown to include a ranking user interface element 336, a user reputation score 236, a listing vote count 342, a help provided count 344, a rank 348, a referral count 350, a community improvement count 352, and a reviews received count 354.

Figure 18:
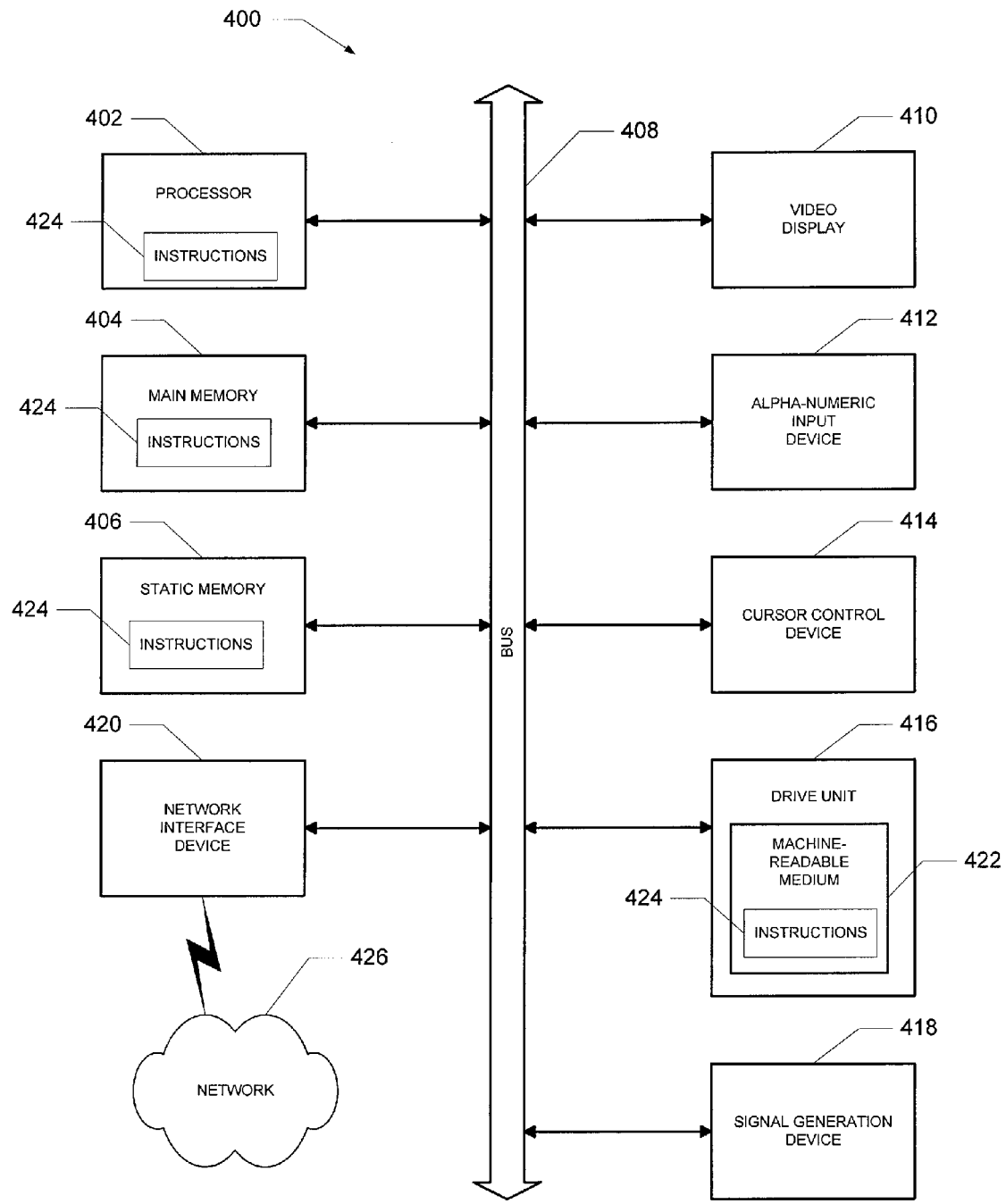
FIG. 18 is a block diagram of a machine, according to an example embodiment, including instructions to perform any one or more of the methodologies described herein.

FIG. 18 shows a diagrammatic representation of machine in the exemplary form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application. The term "machine-readable medium" shall accordingly be taken to include, but not be limited to, solid-state memories, optical and magnetic media, and carrier wave signals.

Technology

The methods and systems describe herein may be embodied in any one or more of the following technologies.

JavaScript

JavaScript is a client side object scripting language used by millions of Web pages and server applications. With syntax similar to Java and C++, JavaScript may behave as both a procedural and object oriented language. JavaScript is interpreted at run time on the client computer and provides various features to a programmer. Such features include dynamic object construction, function variables, dynamic script creation, and object introspection. JavaScript is commonly used to provide dynamic interactivity to Web-pages and interact with a pages' DOM hierarchy.

JSON

JSON is an acronym for JavaScript Object Notation, and is a lightweight data exchange format. Commonly used in AJAX applications as an alternative to XML, JSON is human readable and easy to handle in client side JavaScript. A single function call to eval( ) turns a JSON text string into a JavaScript object. Such objects may easily be used in JavaScript programming, and this ease of use is what makes JSON a good choice for AJAX implementations.

AJAX

AJAX is an acronym for Asynchronous JavaScript and XML but has become synonymous for JavaScript applications that use the HTTP Request object. AJAX allows websites to asynchronously load data and inject it into the website without doing a full page reload. Additionally AJAX enables multiple asynchronous requests before receiving results. Overall the capability to retrieve data from the server without refreshing the browser page allows separation of data and format and enables greatere creativity in designing interactive Web applications.

HTML Push/Comet

Comet is similar to AJAX insomuch that it involves asynchronous communication between client and server. However, Comet applications take this model a step further because a client request is no longer required for a server response.

Java NIO

Java NIO is an acronym for Java's New Input Output package, and is a new API that provides improved performance in such areas as buffer management, scalable network I/O, and file I/O. In particular, an NIO package may support non-blocking socket and file I/O. Non-blocking sockets remove the one socket per thread per client limitations of traditional web server implementations. This allows web servers using the NIO package to service multiple clients with a limited number of sockets and threads

XSL

XSL is a transformation language that may be used to express XML in a different format. Similar to CSS, an XSL document describes how to format an XML hierarchy into HTML or other formats. Generally XSL is used to generate dynamic HTML pages from XML input.

Other Technologies

An example embodiment may be implemented as a dynamic interface and use a set of tools consistent with this platform. In one embodiment, the server technology may include Tomcat and utilize custom java servlets which interface with a MYSQL database. In one embodiment, the communication protocol used for client server communication may be XML. XML may be transformed on the client side by XSL documents. The interface itself may use AJAX to dynamically load content into the interface without refreshing.

Modules, Components, and Logic

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Thus, methods and systems for social shopping on a network-based marketplace have been described. Although the present subject matter has been described with reference to specific exemplary embodiments, it will be evident that various modifications and changes may be made to these embodiments without departing from the broader spirit and scope of the subject matter. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A system comprising:
at least one processor for executing:
a receiving module to receive, over a network at a social shopping platform, a request from a user in a first community of users, the social shopping platform includes a plurality of network-based marketplaces respectively associated with a plurality of communities, plurality of communities includes the first community of users that is associated with a first network-based marketplace;
a processing application to identify the first network-based marketplace from the plurality of network-based marketplaces based on the request, the request for an activity associated with a listing that describes an item for sale in the first network-based marketplace that is used by the first community of users to transact listings of items of a single domain that is of interest to the first community of users; and
a reputation module to update a listing reputation score for the listing based on a user reputation score for the user and based upon the activity associated with the listing, the reputation module further to update the user reputation score based on the listing reputation score.

2. The system of claim 1, wherein the listing reputation score is displayed on a user interface.

3. The system of claim 1, wherein the listing is selected from a group of listings consisting of a listing for a good and a listing for a service.

4. The system of claim 1, wherein the activity associated with the listing is selected from a group consisting of voting for the listing, voting against the listing, posting a comment for the listing, bidding on the listing, buying the listing, submitting a winning bid for the listing, and posting the listing to the first network-based marketplace.

5. The system of claim 1, wherein the activity associated with the listing is associated with an activity constant that is used to update the user reputation score.

6. The system of claim 1, wherein the reputation module is to update the listing reputation score responsive to the receipt of the request, and wherein the reputation module is to update the user reputation score responsive to the receipt of the request.

7. The system of claim 1, wherein the listing reputation score is updated before the user reputation score, and wherein the listing reputation score is based on at least one of a reputation of a seller of the listing, a net count of votes for the listing, a count of continents for the listing, and a count of bids for the listing.

8. The system of claim 1, wherein the listing for sale is selected from a group consisting of a listing that offers a good for purchase and a listing that offers a good for auction.

9. The system of claim 1, wherein the reputation module is to update the listing reputation score and the user reputation score responsive to receipt of the request.

10. A method comprising:
receiving a request, over a network at a social shopping platform, from a user in a first community of users, the social shopping platform including a plurality of network-based marketplaces respectively associated with a plurality of communities, the plurality of communities including the first community of users that is associated with a first network-based marketplace;
identifying the first network-based marketplace from the plurality of network-based marketplaces based on the request, the request for an activity associated with a listing for sale in the first network-based marketplace that is used by the first community of users to transact listings that describe items of a single domain that is of interest to the first community of users;
updating a listing reputation score for the listing based on a user reputation score for the user and based upon the activity associated with the listing; and
updating the user reputation score based on the listing reputation score.

11. The method of claim 10, further comprising generating a user interface that displays the listing reputation score.

12. The method of claim 10, wherein the listing for sale is selected from a group consisting of a listing for a good and a listing for a service.

13. The method of claim 10, wherein the activity associated with the listing is selected from a group of activities consisting of voting for the listing, voting against the listing, posting a comment for the listing, bidding on the listing, buying the listing, submitting a winning bid for the listing, and posting the listing to the first network-based marketplace.

14. The method of claim 10, wherein the activity associated with the listing is associated with an activity constant that is used to update the user reputation score.

15. The method of claim 10, wherein the updating the listing reputation score is responsive to the receiving, and wherein the updating the user reputation score is responsive to the receiving.

16. The method of claim 10, wherein the listing reputation score is updated before the user reputation score, and wherein the listing reputation score is based at least one of a reputation of a seller of the listing, a net count of votes for the listing, a count of comments for the listing, and a count of bids for the listing.

17. The method of claim 10, wherein the listing for sale is selected from a group consisting of offering the listing for purchase and offering the listing for auction.

18. The method of claim 10, wherein the updating the listing reputation score and the updating the user reputation score is responsive to receipt of the request.

19. A non-transitory machine-readable medium storing instructions that, when executed by a machine, cause the machine to:
receive a request, over a network at a social shopping platform, from a user in a first community of users, the social shopping platform including a plurality of network-based marketplaces respectively associated with a plurality of communities, the plurality of communities including the first community of users that is associated with a first network-based marketplace;
identify the first network-based marketplace from the plurality of network-based marketplaces based on the request, the request thr an activity associated with a listing for sale in the first network-based marketplace that is used by the first community of users to transact listings that describe items of a single domain that is of interest to the first community of users;
update a listing reputation score for the listing based on a user reputation score for the user and based upon the activity associated with the listing; and
update the user reputation score based on the listing reputation score.

20. A system comprising:
a first means for receiving a request, over a network in a social shopping platform, from a first user in a first community of users, the social shopping platform includes a plurality of network-based marketplaces respectively associated with a plurality of communities, the plurality of communities includes the first community of users that is associated with a first network-based marketplace;
at least one processor;
a processing application that is executable by the at least one processor to identify the first network-based marketplace from the plurality of network-based marketplaces based on the request, the request to initiate an activity with a second user, in the first community of users, in the first network-based marketplace that is used by the first community of users to transact listings that describe items of a single domain that is of interest to the first community of users;
a second means for updating a first user reputation score for the first user based on a second user reputation score for the second user and to based upon the activity initiated, the second means further update the second user reputation score based on the first user reputation score.

21. A system comprising:
at least one processor for executing:
a receiving module to receive a request, over a network in a social shopping platform, from a user in a first community of users, the social shopping platform includes a plurality of network-based marketplaces respectively associated with a plurality of communities, the plurality of communities includes the first community of users that is associated with a first network-based marketplace;
a processing application to identify the first network-based marketplace from the plurality of network-based marketplaces based on the request, the request for an activity associated with a component accessed via the first network-based marketplace that is used by the first community of users to transact listings that describe items of a single domain that is of interest to the first community of users; and a reputation module to update a component reputation score for the component based on a user reputation score for the user and based upon the activity associated with the component, the reputation module further to update a reputation score for the user based on the component reputation score.

22. The system of claim wherein the component includes an application that provides a service for the first community of users on the network-based marketplace, and wherein the activity is selected from a group consisting of contributing the application to the first network-based marketplace and voting to approve or disapprove the application.

23. The system of claim 21, wherein the component includes at least one user interface element for display on the first network-based marketplace, and wherein the activity is selected from a group consisting of contributing the at least one user interface element to the first network-based marketplace and voting to approve or disapprove the at least one user interface element.

24. A method comprising:
receiving a request, over a network at a social shopping platform, from a user in a first community of users, the social shopping platform including a plurality of network-based marketplaces respectively associated with a plurality of communities, the plurality of communities including the first community of users that is associated with a first network-based marketplace;
identifying the first network-based marketplace from the plurality of network-based marketplaces based on the request, the request being for an activity associated with a component accessed via the first network-based marketplace that is used by the first community of users to transact listings that describe items of a single domain that is of interest to the first community of users;
updating a component reputation score for the component based on a user reputation score for the user and based upon the activity associated with the component; and
updating a reputation score for the user based on the component reputation score.

25. The method of claim 24, wherein the component includes an application that provides a service for the first community of users on the first network-based marketplace, and wherein the activity is selected from a group consisting of contributing the application to the first network-based marketplace and voting to approve or disapprove the application.

26. The method of claim 24, wherein the component includes at least one user interface element for display on the first network-based marketplace, and wherein the activity is selected from a group consisting of contributing the at least one user interface element to the first network-based marketplace and voting to approve or disapprove the at least one user interface element.

27. A non-transitory machine-readable medium storing instructions that, when executed by a machine, cause the machine to:
receive a request, over a network at a social shopping platform, from a user in a first community of users, the social shopping platform includes a plurality of network-based marketplaces respectively associated with a plurality of communities, the plurality of communities includes a first community of users that is associated with a first network-based marketplace;
identify the first network-based marketplace from the plurality of network-based marketplaces based on the request, the request for an activity associated with a component accessed via the first network-based marketplace that is used by the first community of users to transact listings that describe items of a single domain that is of interest to the first community of users;
update a component reputation score for the component based on a user reputation score for the user and based upon the activity associated with the component; and
update a reputation score for the user based on the component reputation score.

28. A system comprising:
a first means for receiving a request, over a network at a social shopping platform, from a user in a first community of users, the social shopping platform includes a plurality of network-based marketplaces respectively associated with a plurality of communities, the plurality of communities includes the first community of users that is associated with a first network-based marketplace;
at least one processor;
a processing application that is executable by the at least one processor to identify the first network-based marketplace from the plurality of network-based marketplaces based on the request, the request for an activity associated with a component accessed via the first network-based marketplace that is used by the first community of users to transact listings that describe items of a single domain that is of interest to the first community of users; and
a second means for updating a component reputation score for the component based on a user reputation score for the user and based upon the activity associated with the component, the second means further to update a reputation score for the user based on the component reputation score.

29. A system comprising:
at least one processor for executing:
a receiving module to receive a request, over a network at a social shopping platform, from a first user in a first community of users, the social shopping platform includes a plurality of network-based marketplaces respectively associated with a plurality of communities, the plurality of communities includes the first community of users that is associated with a first network-based marketplace;
a processing application to identify the first network-based marketplace from the plurality of network-based marketplaces based on the request, the request to initiate an activity with a second user, in the first community of users, in the first network-based marketplace that is used by the first community of users to transact listings that describe items of a single domain that is of interest to the first community of users; and
a reputation module to update a first user reputation score for the first user based on a second user reputation score for the second user and based upon the activity initiated, the reputation module further to update the second user reputation score based on the first user reputation score.

30. The system of claim 29, wherein the activity is selected from a group consisting of referring a user to the first community of users and requesting help from a user in the first community of users.

31. The system of claim 29, wherein the first user reputation score is based on the second user reputation score being scaled by a value that corresponds to the activity.

32. A method comprising:
receiving a request, over a network at a social shopping platform, from a first user in a first community of users, the social shopping platform including a plurality of network-based marketplaces respectively associated with a plurality of communities, the plurality of communities including the first community of users that is associated with a first network-based marketplace;

identifying the first network-based marketplace from the plurality of network-based marketplaces based on the request, the request to initiate an activity with a second user, in the first community of users, in the first network-based marketplace that is used by the first community of users to transact listings that describe a plurality of items of a single domain that is of interest to the first community of users;

updating a first user reputation score for the first user based on a second user reputation score for the second user and based upon the activity initiated; and updating the second user reputation score based on the first user reputation score.

33. The method of claim 32, wherein the activity is selected from a group consisting of referring a user to the first community of users and requesting help from a user in the first community of users.

34. The method of claim 32, wherein the first user reputation score is based on the second user reputation score being scaled by a value that corresponds to the activity.

35. A non-transitory machine-readable medium storing instructions that, when executed by a machine, cause the machine to:

receive a request, over a network at a social shopping platform, from a first user in a first community of users, the social shopping platform includes a plurality of network-based marketplaces respectively associated with a plurality of communities the plurality of communities includes the first community of users that is associated with a first network-based marketplace;

identify the first network-based marketplace from the plurality of network-based marketplaces based on the request, the request to initiate an activity with a second user, in the first community of users, in the first network-based marketplace that is used by the first community of users to transact listings that describe a plurality of items of a single domain that is of interest to the first community of users;

update a first user reputation score for the first user based on a second user reputation score for the second user and based upon the activity initiated; and update the second user reputation score based on the first user reputation score.

36. A system comprising:

a first means for receiving a request, over a network at a social shopping platform, from a first user in a first community of users, the social shopping platform includes a plurality of network-based marketplaces respectively associated with a plurality of communities, the plurality of communities includes the first community of users that is associated with a first network-based marketplace;

at least one processor;

a processing application that is executable by the at least one processor to identify the first network-based marketplace from the plurality of network-based marketplaces based on the request, the request to initiate an activity with a second user, in the first community of users, in the first network-based marketplace that is used by the first community of users to transact listings that describe items of a single domain that is of interest to the first community of users; and a second means for updating a first user reputation score for the first user based on a second user reputation score for the second user and based upon the activity initiated, the second means further to update the second user reputation score based on the first user reputation score.

* * * * *